Nov. 2, 1926.
A. F. FLYNN
1,605,827
LAWN MOWER ATTACHMENT
Filed Oct. 13, 1924
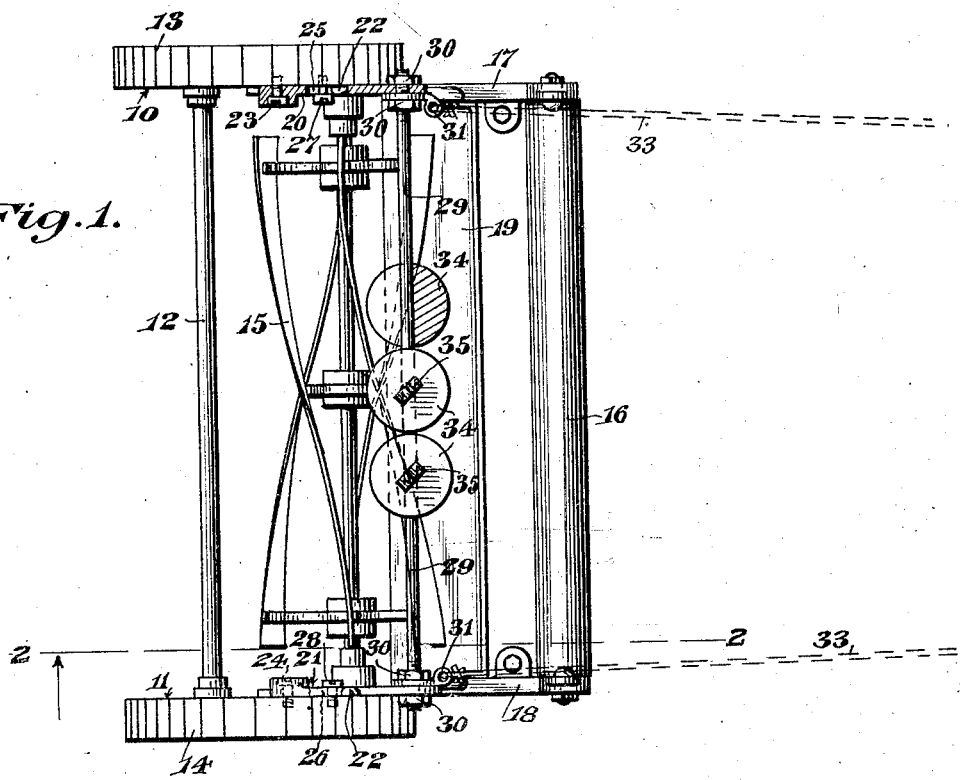
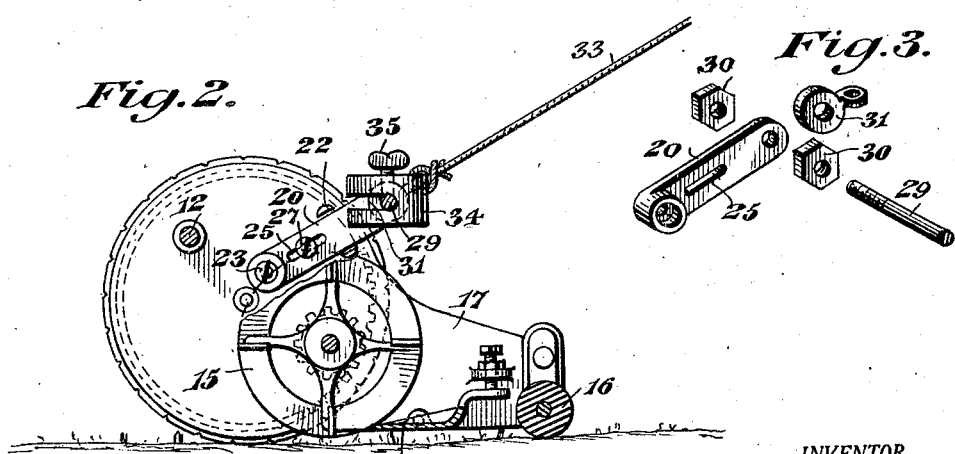
INVENTOR.
Andrew F. Flynn,
BY
Geo. F. Kimmel, ATTORNEY.

Patented Nov. 2, 1926.

1,605,827

UNITED STATES PATENT OFFICE.

ANDREW F. FLYNN, OF DEXTER, MAINE.

LAWN-MOWER ATTACHMENT.

Application filed October 13, 1924. Serial No. 743,448.

This invention relates to lawn mowers, and has for one of its objects to provide a simply constructed attachment whereby inclined surfaces, such as the approaches to terraces and the like, may be evenly and uniformly clipped with equal facility to the level surfaces of lawns and the like.

Another object of the invention is to provide an attachment of this character which may readily be applied without structural change in the mower or material structural change in the attachment.

With these and other objects in view the invention consists in certain novel features of construction as hereinafter shown and described and then specifically pointed out in the claims, and in the drawings illustrative of the preferred embodiment of the invention.

Figure 1 is a plan view of a conventional lawn mower with the improved attachment applied.

Figure 2 is a section on the line 2—2 of Figure 1, looking in the direction of the arrow.

Figure 3 represents one of the coacting rod supporting members and one of the pull member clips and a part of the combined tie rod and weight support, in perspective and disconnected.

Great difficulty is experienced in operating the ordinary construction of lawn mowers, with rigid handle members, upon inclined surfaces such as the inclined approaches to terraces and the like, and to adapt the ordinary lawn mower for operation on inclined surfaces of this character with equal facility to the operation on level surfaces, the herein disclosed attachment has been devised. The improved attachment may be adapted without material structural change to lawn mowers of various makes and constructions, but for the purpose of illustration is shown applied to a conventional construction of a device of this character in which 10, 11 represent the confronting traction wheel supports and guards coupled by a tie bar 12.

The traction wheels are represented at 13 and 14 and the knife cylinder at 15, the rear supporting member at 16 supported in brackets 17 and 18 extending from the guard members 10 and 11, and the stationary shearing blade at 19. In preparing the mower for the application of the improved attachment, the usual rigid handles, not shown, are detached, and supporting brackets 20 and 21 attached in their places.

The usual rigid handles are connected respectively to the confronting faces of the traction wheel supports and guards 10 and 11 by cap screws, and in many lawn mowers spaced stop lugs 22 are provided which project from the confronting faces of the traction wheel supports and guards 10 and 11, and between which the usual handle supports are disposed, and these lugs are utilized to assist in holding the arms 20 and 21 of the improved attachment in place. The threaded apertures which receive the cap screws whereby the handle supports are secured are also utilized to receive like cap screws 23 and 24 engaging in the threaded apertures for the like cap screws which attach the arms 20 and 21 in place upon the traction wheel supports and guards 10 and 11.

The arms 20 and 21 are longitudinally slotted as shown at 25 and 26 to receive cap screws 27 and 28 engaging in the arms 10 and 11, as additional holding means for the guard members 20 and 21.

At their inner ends the arms 20 and 21 are connected by a combined tie rod and weight support 29, the latter held in place upon the arms by clamp nuts 30.

Engaging the rod 29 at the ends are clip devices 31 and 32, preferably held in place by the clamp nuts 30, and perforated to receive a combined pull and holding member, preferably a cord or cable, portions of which are represented at 33.

A plurality of bifurcated weights, represented at 34, are mounted on the rod 29, and each held in place by a set screw 35. When the weights are mounted on the rod 29 the solid portions thereof extend rearwardly from said rod.

The arms 20 and 21 are of sufficient length to enable the rod 29 to be disposed rearwardly of the line of the cutting cylinder and stationary blade 19, so that the force of the weights 34 will be exerted to hold the cutting elements in operative relation to the grass being cut when the mower is moving over an inclined surface.

By this simple attachment, the mower when disposed upon an inclined surface, will move by gravity thereover, and be guided and controlled by power applied manually to the combined pull and holding members 33, the latter enabling the speed of the downward movement to be controlled and the mower guided, and then the mower drawn back to the upper part of the inclined surface and positioned to move by gravity over another unmowed portion, the weights 34 operating to hold the cutting elements in their work no matter how steep the incline may be.

The improved device is simple in construction, can be inexpensively manufactured and applied, and enables relatively steep surfaces to be mowed with equal facility to level surfaces.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention what is claimed is:

1. An attachment for lawn mowers having a combined wheel support and guard comprising a pair of inclined arms each adapted to have its lower end secured to the inner side of and its upper end projected rearwardly from the combined wheel support and guard, means for securing each of said arms intermediate its ends to a combined support and guard, a combined tie and weight supporting rod having its ends connected to the rear ends of said arms, and rearwardly extending attaching members for a pulling or holding means, said members mounted on said rod and clamped against the rear ends of said arms.

2. An attachment for lawn mowers having a combined wheel support and guard comprising a pair of inclined arms each adapted to have its lower end secured to the inner side of and its upper end projected rearwardly from the combined wheel support and guard, means for securing each of said arms intermediate its ends to a combined support and guard, a combined tie and weight supporting rod having its ends connected to the rear ends of said arms, rearwardly extending attaching members for a pulling or holding means, said members mounted on said rod and clamped against the rear ends of said arms, and bifurcated weights provided with means for detachably securing them to said rod and having the solid portions thereof extended rearwardly from the rod.

In testimony whereof, I affix my signature hereto.

ANDREW F. FLYNN.